United States Patent [19]

Ito et al.

[11] Patent Number: 5,178,104
[45] Date of Patent: Jan. 12, 1993

[54] TWO CYCLE DIESEL ENGINE

[75] Inventors: Hideaki Ito; Masanori Miyamoto, both of Iwata, Japan

[73] Assignee: Yamaha Hatsudoki Kabushiki Kaisha, Iwata, Japan

[21] Appl. No.: 590,002

[22] Filed: Sep. 28, 1990

[30] Foreign Application Priority Data

Sep. 29, 1989 [JP] Japan .................... 1-253930

[51] Int. Cl.⁵ ............................ F02B 25/20
[52] U.S. Cl. ................. 123/73 A; 123/65 V; 123/73 C
[58] Field of Search ............... 123/73 A, 73 B, 73 C, 123/65 V, 65 PE, 490, 492, 73 R

[56] References Cited

U.S. PATENT DOCUMENTS

| | | | |
|---|---|---|---|
| 4,354,461 | 10/1982 | Heismann et al. | 123/73 A |
| 4,577,597 | 3/1986 | Tomita | 123/73 A |
| 4,590,897 | 5/1986 | Hundertmark | 123/73 A |
| 4,779,581 | 10/1988 | Maier | 123/73 A |
| 4,825,821 | 5/1989 | Baltz | 123/73 A |
| 4,920,932 | 1/1990 | Schlunke | 123/73 C |
| 4,958,609 | 9/1990 | Trombley et al. | 123/73 C |
| 4,987,876 | 1/1991 | Minamitani et al. | 123/492 |
| 4,995,354 | 2/1991 | Morikawa | 123/65 V |
| 4,998,512 | 3/1991 | Masuda et al. | 123/65 PE |
| 5,042,442 | 8/1991 | Laskaris et al. | 123/73 C |

Primary Examiner—E. Rollins Cross
Assistant Examiner—M. Macy
Attorney, Agent, or Firm—Ernest A. Beutler

[57] ABSTRACT

A diesel engine operating on the two cycle crankcase compression principle and having a means for reducing nitrous oxide emissions under low and medium range speeds. This is done by throttling the scavenge air flow which can be accomplished either by throttling the air admitted to the crankcase chamber or bypassing a portion of the compressed air from the crankcase chamber back to the induction system. In addition, an exhaust control valve is provided for raising the compression ratio and the injection timing is advanced when the scavenge air is reduced so as to further improve the control of hydrocarbon and carbon monoxide emissions.

28 Claims, 9 Drawing Sheets

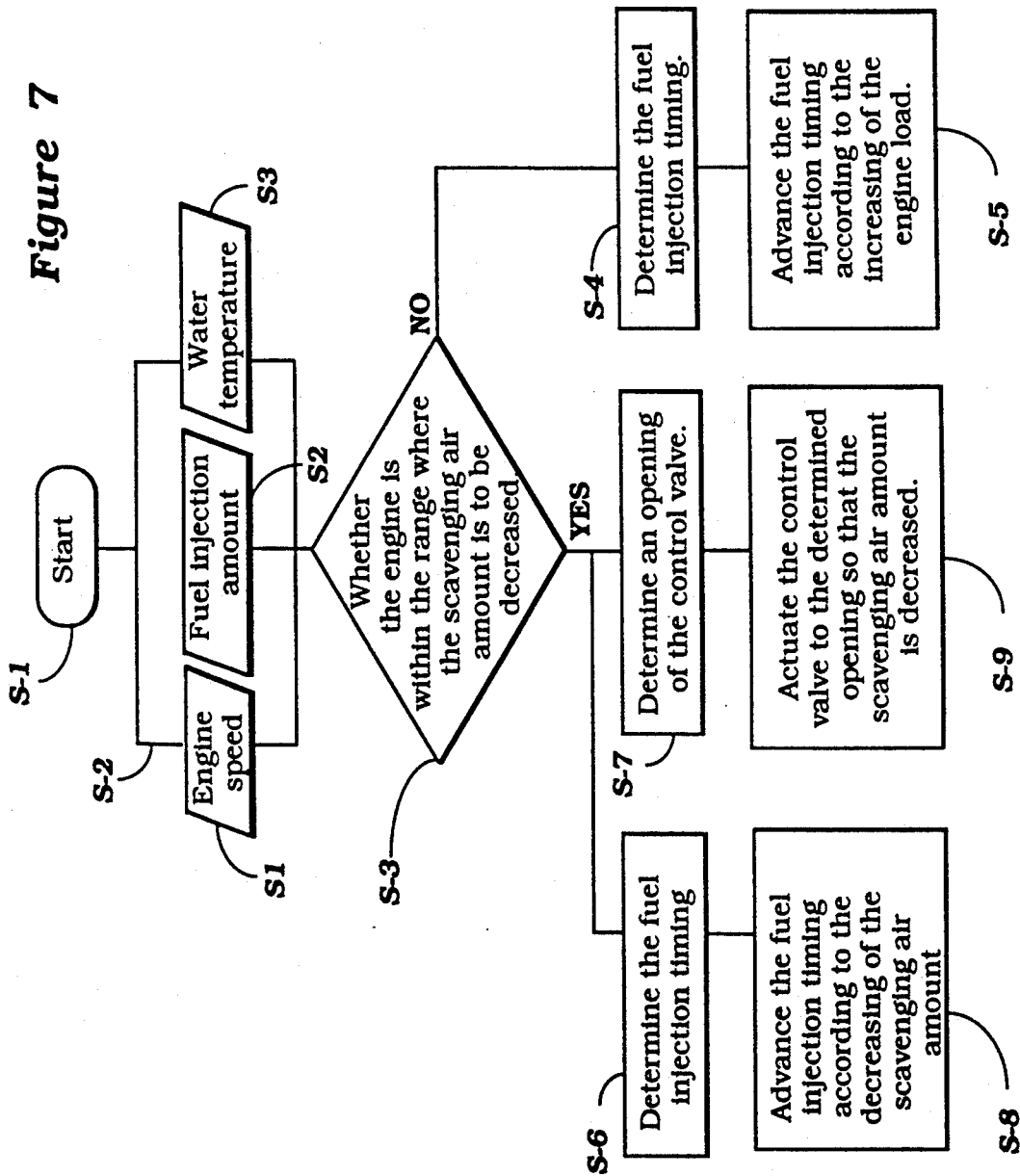

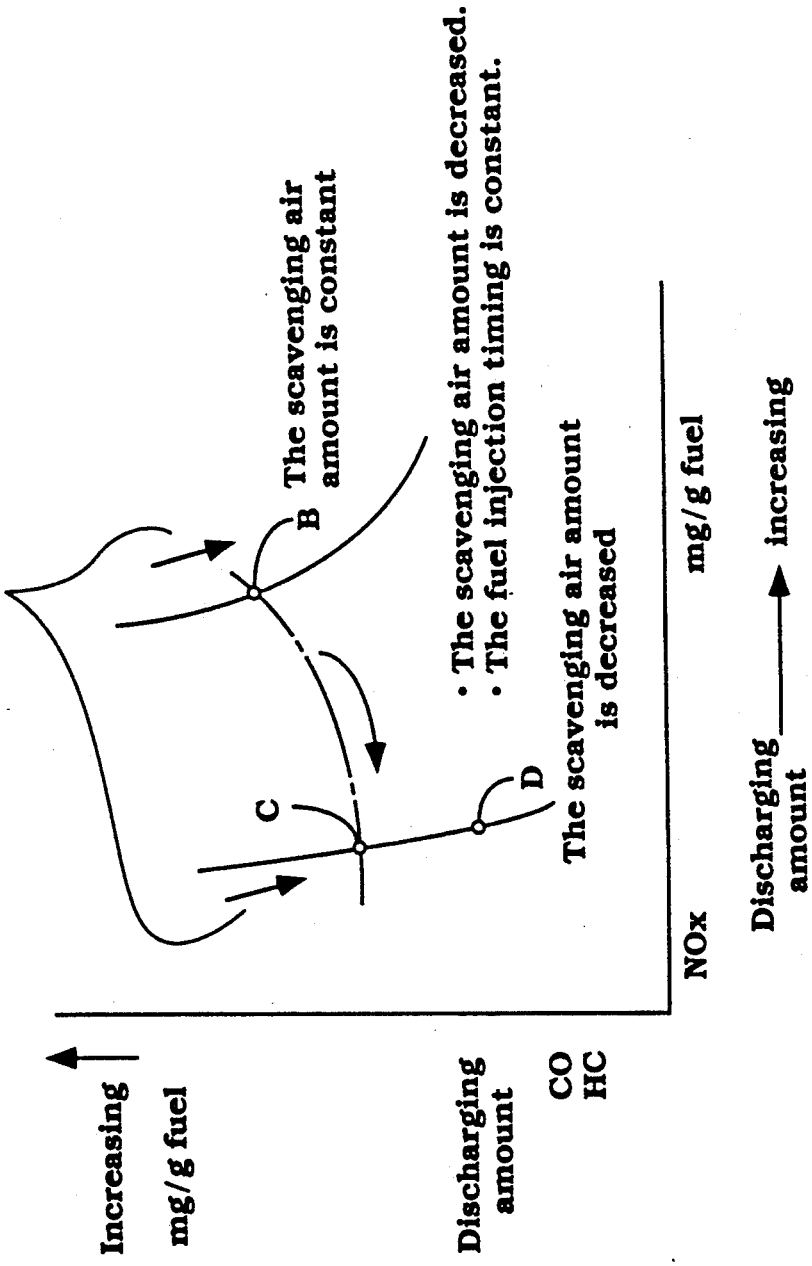

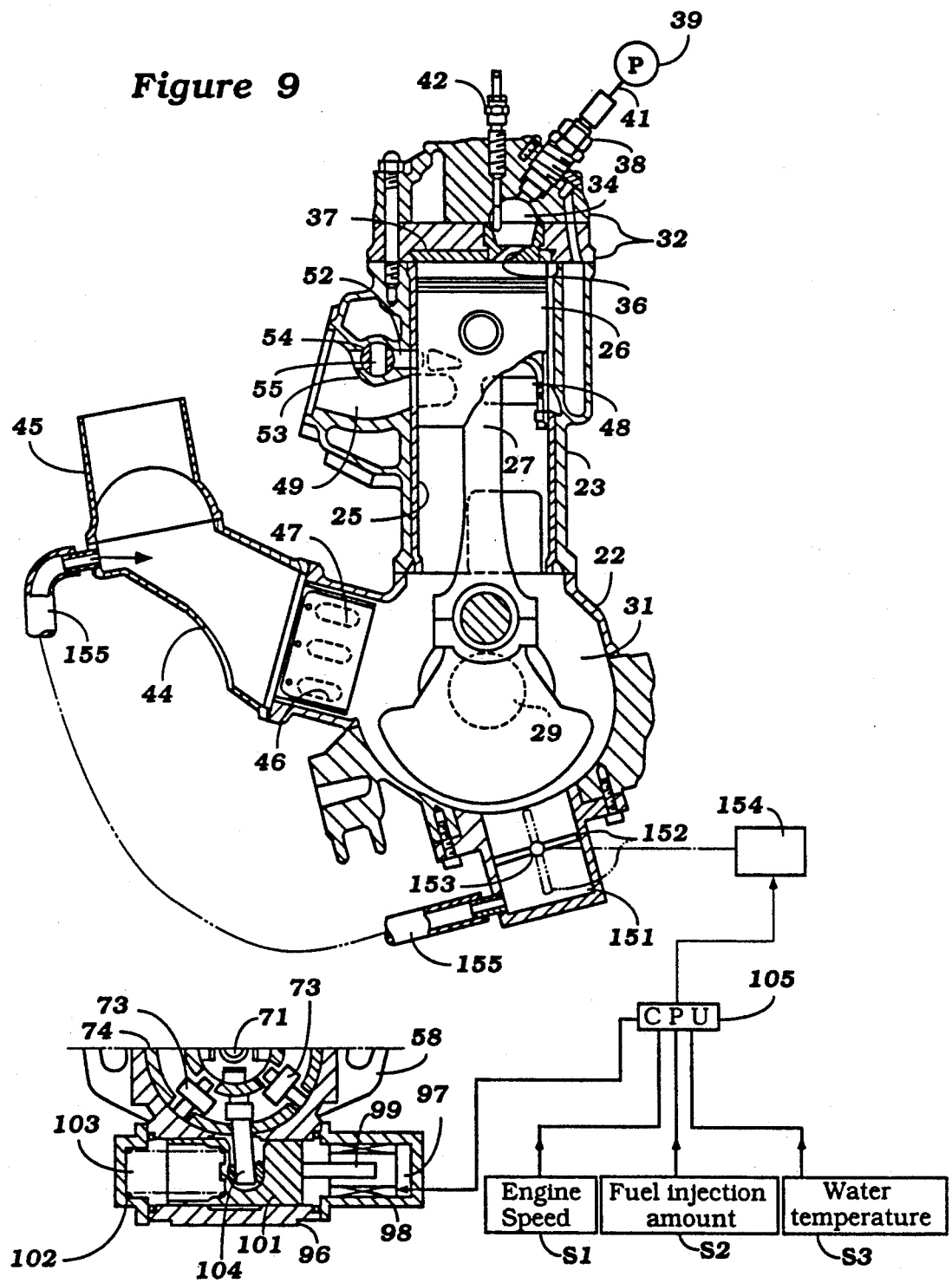

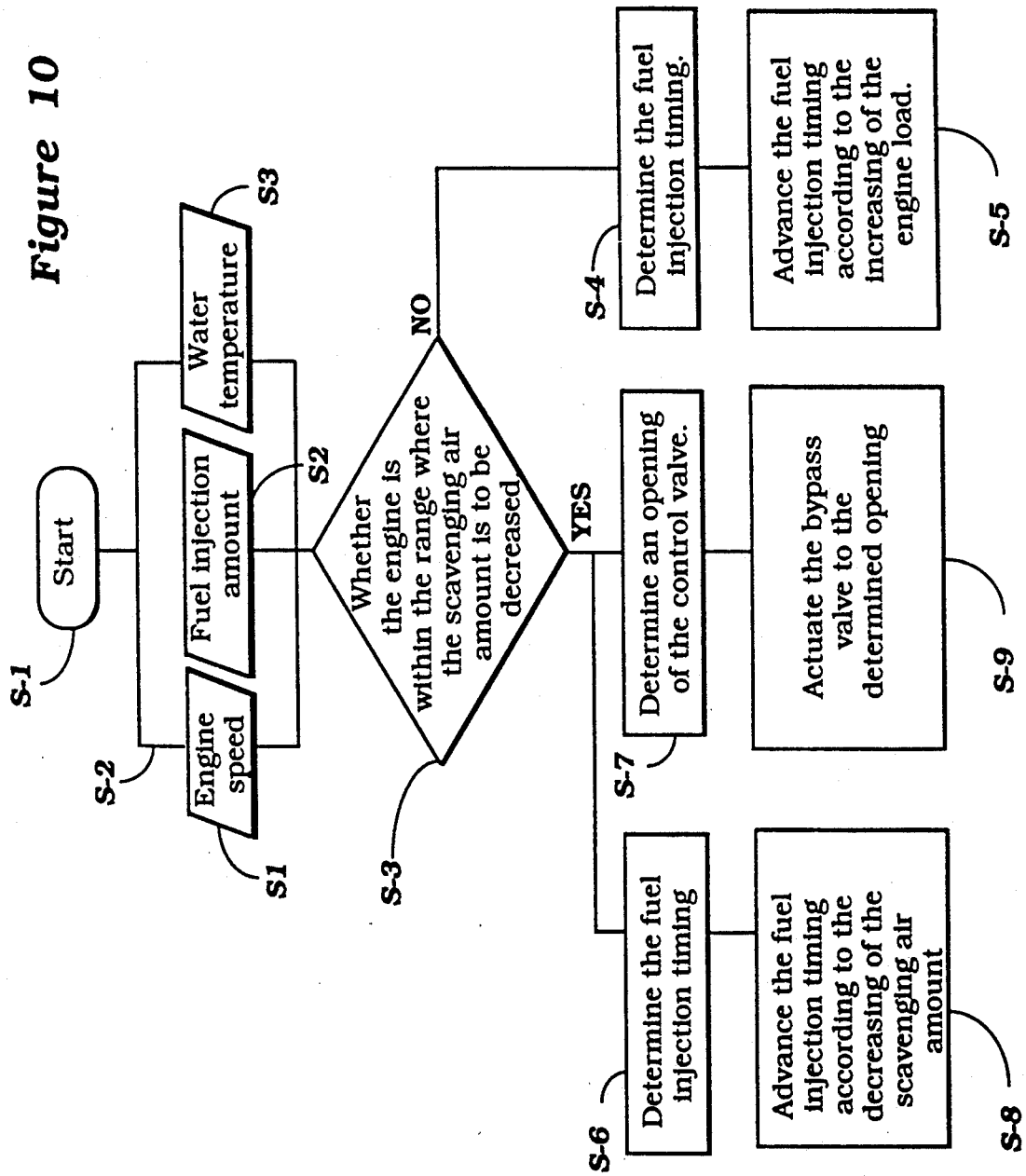

TWO CYCLE DIESEL ENGINE

BACKGROUND OF THE INVENTION

This invention relates to a two cycle diesel engine and more particularly to a two cycle diesel engine and a method of operating it that will reduce the nitrous oxide emissions, particularly at low and mid ranges.

The fuel efficiency of diesel engines is well known. This fuel efficiency is achieved through the use of high compression ratios and thus the possibility to extract a greater amount of thermal energy from the burning of the fuel than engines running on lower compression ratios. However, although the fuel efficiency of an engine operating on the diesel cycle can be improved over that of one operating on the Otto cycle, there are certain other problems in connection with diesel engines.

Specifically, a diesel engine, because of its higher combustion chamber pressures and temperatures, is likely to present greater problems in connection with nitrous oxide (NOx) emissions than spark ignited engines. If the engine is operated in such a manner that the NOx emissions are reduced, there may be a problem with hydrocarbon, carbon particles or carbon monoxide in the exhaust gases. These problems are particularly acute when running at low or mid ranges. In addition, a characteristic similar to the knocking of a spark ignited engine is frequently a problem with diesel engines due to the high compression ratios, compression pressures and combustion system temperature.

It is, therefore, a principal object of this invention to provide an improved diesel engine and method for running it wherein the nitrous oxide emissions can be more adequately controlled.

It is further object of this invention to provide an improved arrangement for a diesel engine that will reduce the nitrous oxide emissions and combustion chamber temperatures at low and mid range performance.

In connection with diesel engines and particularly two cycle crankcase compression diesel engines, it has been proposed to employ an exhaust control valve which is effective to provide an increase in compression ratio of the engine under certain running conditions. Normally, this increased compression ratio is provided at low and mid range performances to improve efficiency and avoid the likelihood of knocking when running at high loads and high speed conditions. However, such increased compression ratio further aggravates the nitrous oxide problems aforementioned.

It is a further object of this invention to provide a two cycle crankcase compression diesel engine operating on variable compression ratio and wherein combustion chamber temperatures are lowered at low and mid range performance to reduce the likelihood of nitrous oxide emissions.

SUMMARY OF THE INVENTION

This invention is adapted to be embodied in a two cycle crankcase compression diesel engine having a cylinder defining in part a combustion chamber. A crankcase is provided and means are provided for admitting an air charge to the crankcase. Scavenge means transfer a charge compressed in the crankcase to the combustion chamber. In accordance with the invention, means are provided for reducing the amount of air flow through the scavenge means at low and mid range speeds for reducing combustion system temperature and nitrous oxide emissions.

BRIEF DESCRIPTION OF THE DRAWINGS

FIG. 7 is a block diagram showing the control routine of this embodiment of the invention.

FIG. 8 is a graphic view showing the relationship between NOx emission and CO and HC emissions under varying conditions of fuel injection timing and control of scavenge air flow.

FIG. 9 is a cross sectional view, in part similar to FIG. 3, and shows another embodiment of the invention.

FIG. 10 is a block diagram showing the control routine of this other embodiment of the invention.

DETAILED DESCRIPTION OF THE PREFERRED EMBODIMENTS

Figure 1:
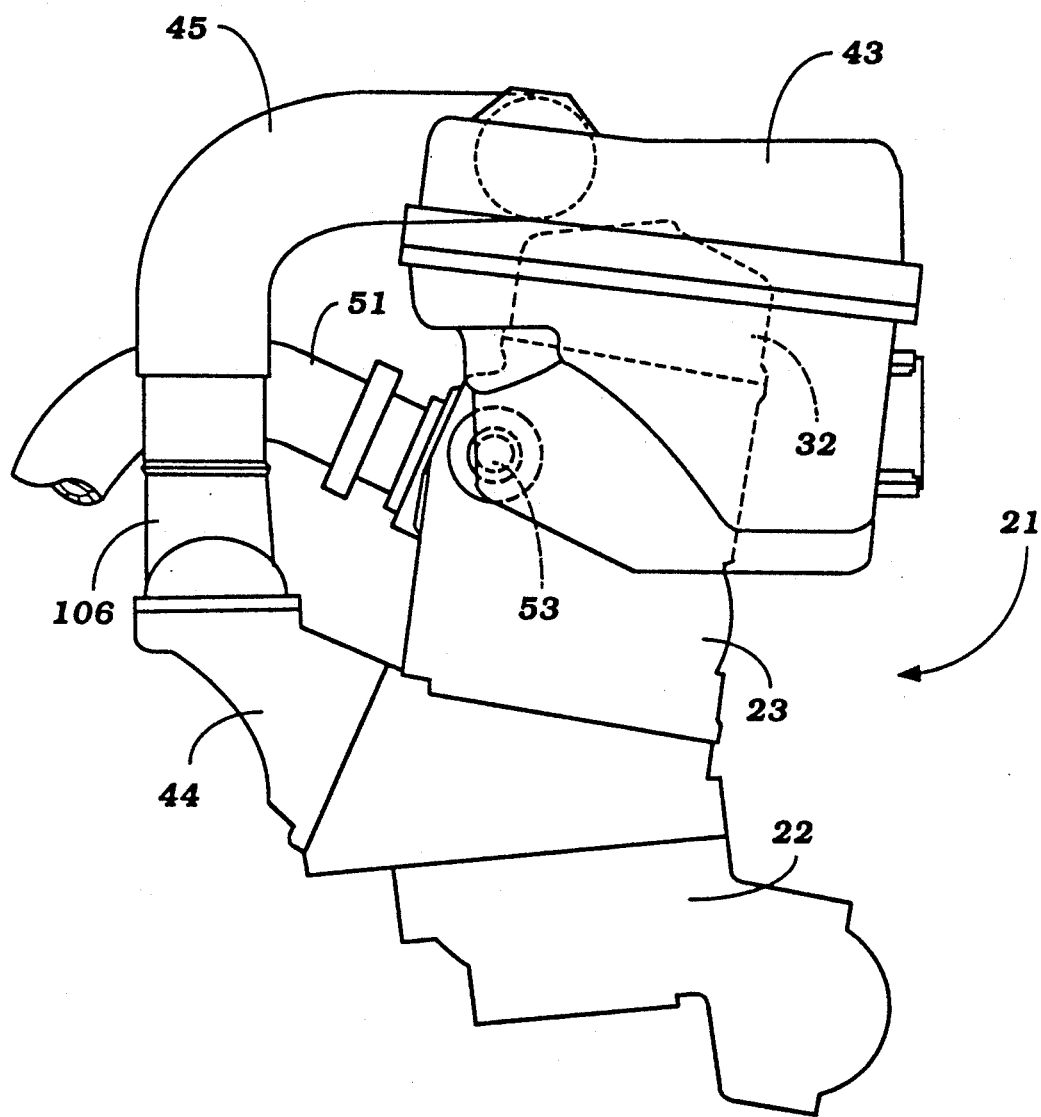
FIG. 1 is a front plan view of a two cycle crankcase compression diesel engine constructed and operated in accordance with an embodiment of the invention.

Referring now in detail to the drawings and initially primarily to FIGS. 1 through 4, a two cycle diesel engine operating on the crankcase compression two stroke principle and constructed in accordance with an embodiment of the invention is identified generally by the reference numeral 21. In the illustrated embodiment, the engine 21 is designed primarily for automotive application. It is to be understood, however, that the invention can be utilized in conjunction with other applications for such engines and that certain facets of the invention can be employed with engines other than diesel engines operating on the two stroke principle. However, the invention has particular utility with such engines.

The engine 21 includes a crankcase assembly 22 that is connected to the lower end of a cylinder block 23. In the illustrated embodiment, the engine 21 is of the three cylinder in line type. To this end the cylinder block 23 is provided with three parallel cylinder liners 24 that define cylinder bores 25. Although the invention is described in conjunction with a three cylinder in line type engine, it should be readily apparent to those skilled in the art how the invention can be practiced in conjunction with engines having different cylinder numbers and different cylinder orientations. In fact, certain facets of the invention can be employed with engines of the rotary type.

Pistons 26 are slidably supported in each of the cylinder bores 25 and are connected by means of connecting rods 27 to throws 28 of a crankshaft 29 which is rotatably journaled in the crankcase 22 in a known manner.

Individual crankcase chambers 31 are formed within the crankcase 22 and are sealed from each other in a suitable manner, as is typical with crankcase compression type engines.

A cylinder head assembly 32, which is comprised of a two piece construction, is affixed to the cylinder block 23 by threaded fasteners 33. The two piece construction of the cylinder head 32 permits the formation of a precombustion or torch chamber 34 which communicates with a main combustion chamber 35 formed above the head of the piston 26 through a restricted throat 36. A liner 37 may be formed on the underside of the lower cylinder head portion and the throat 36 may be formed in a separate insert piece.

A fuel injector, indicated generally by the reference numeral 38, is provided in the cylinder head 32 for discharge into each prechamber 24 and is supplied with high pressure fuel from a timing and injection pump 39 which is shown in most detail in FIGS. 3 and 4 and will be described later by particular reference to these figures. A supply line 41 connects the timing and injection pump 39 with each of the injectors 38 and only the connection to a single injector is shown in FIG. 4.

A glow plug 42 is provided in the cylinder head 32 for each prechamber 34 and operates in a known manner.

An air charge for running of the engine 21 is provided from an air cleaner and silencer 43 which, in turn, supplies air to an intake manifold 44 through a conduit 45. The manifold 44 communicates this air charge to the individual crankcase chambers 31 through inlet passages 46 formed in a side of the crankcase 22 and in which reed type check valves 47 are provided. The reed type check valves, as is well known in this art, are provided so as to insure against reverse flow when the intake air charge is compressed in the crankcase chambers 31.

The compressed charge is then transferred to the area above the piston 26 as the piston moves downwardly toward its bottom dead center position through one or more scavenge passages 48. This charge is then further compressed in the combustion chamber 35 and prechamber 34 and after the fuel injector 38 begins its injection, the fuel will ignite due to the high pressure and temperature of this charge and burn to drive the piston downwardly in a well known manner.

Burnt charge is then discharged to the atmosphere through a main exhaust port 49 that extends through the cylinder block 23 and which communicates with an exhaust manifold 51 and exhaust system including a muffler (not shown) for discharge of the exhaust gases to the atmosphere.

Figure 3:
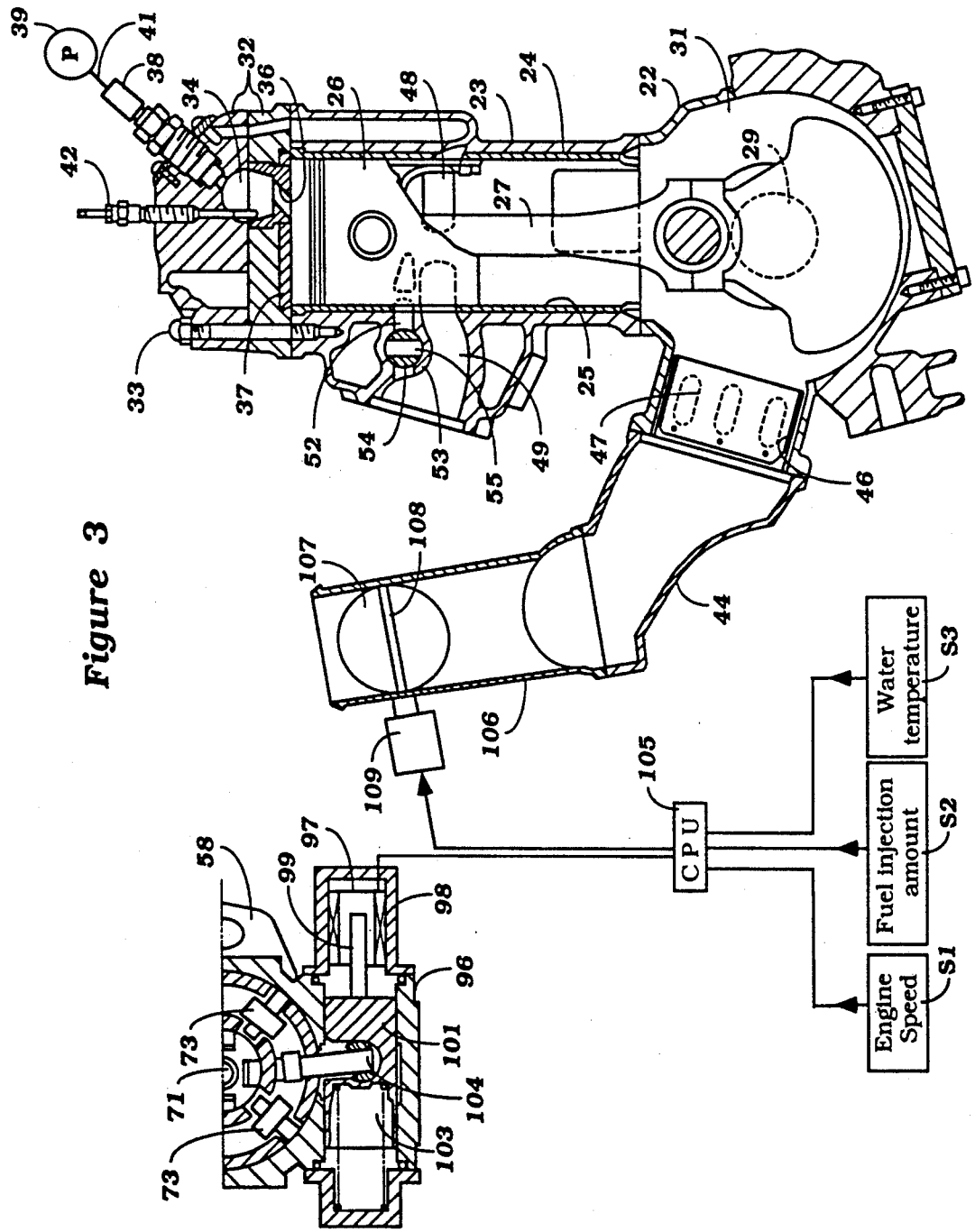
FIG. 3 is a cross sectional view taken along a plane parallel to the plane of FIG. I and through one of the cylinder bores and through a portion of the fuel injection timing control unit.
Figure 4:
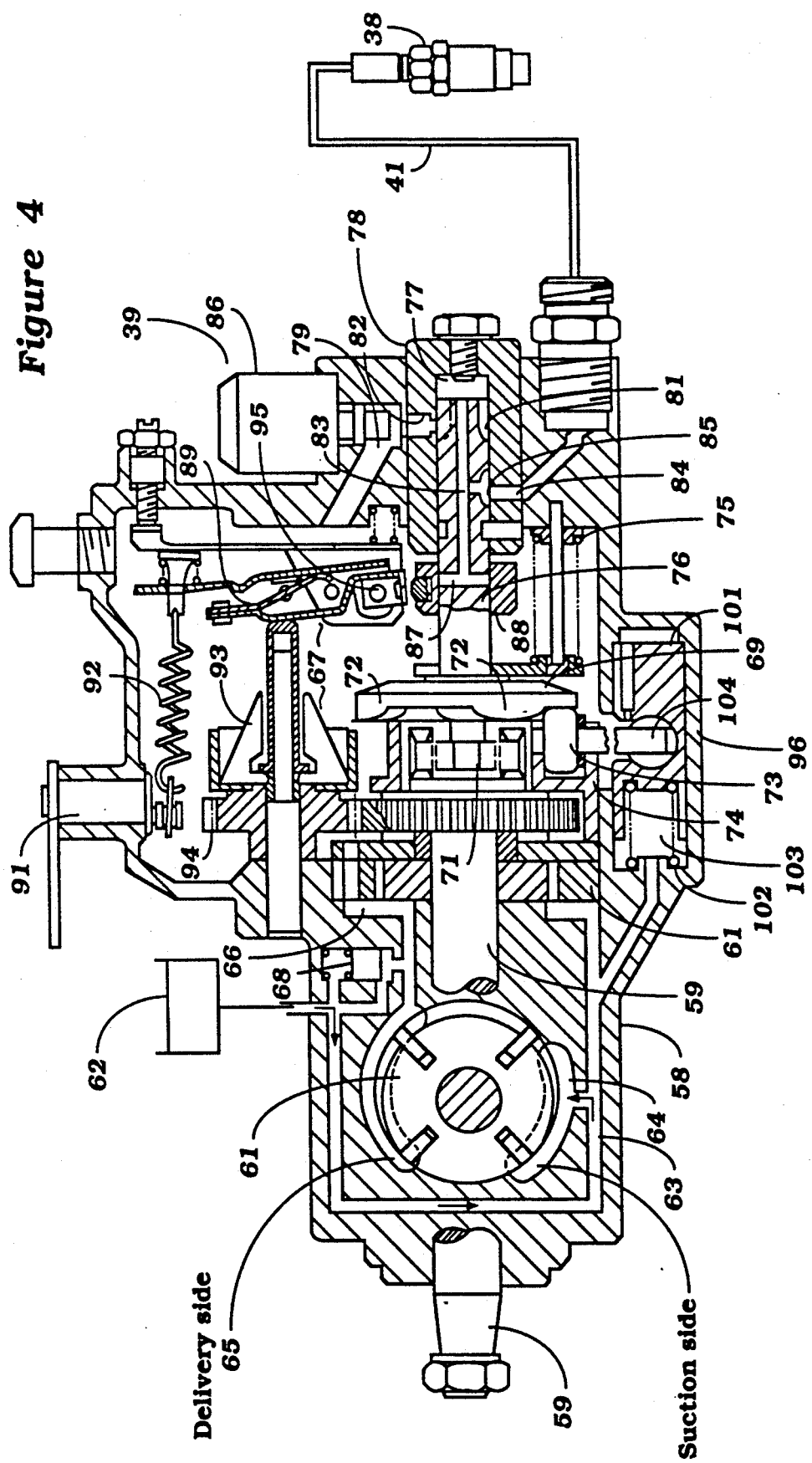
FIG. 4 is an enlarged cross sectional view taken through the fuel injection unit and showing its relationship to one of the fuel injectors.

An auxiliary or sub exhaust port 52 is formed in a projection 53 of the cylinder block 23 which extends into the main exhaust port 49 and which may be formed by a drilled passage extending through the outer opening of the main exhaust port 49 as should be readily apparent from FIG. 3. A rotary type valve 54 having a flow opening 55 is journaled within the auxiliary exhaust port 52 for controlling the opening and closing of the communication of the port 52 with the main exhaust port 49. FIG. 3 shows the construction in its closed position. In this position, the main exhaust port 49 will not be opened until the piston 26 has descended a substantial distance from the lower surface of the cylinder head and, hence, the engine will have a relatively high effective compression ratio. However, when the exhaust control valve 54 is rotated to its opened position so that the passage 55 communicates the port 52 with the main exhaust port 49, the exhaust timing will open once the piston has descended the lesser distance or at an earlier time than when the exhaust control valve 54 is closed. This will result in a reduction in the compression ratio. The point at which the compression ratio is altered will be discussed later in conjunction with the description of the remaining figures. An actuator element which may comprise a stepping motor or the like is operated by a CPU to open and close the exhaust control valves 54 in accordance with the strategy which will be discussed.

The fuel injection and timing pump 39 will now be described in detail by particular reference to FIGS. 3 and 4. This pump includes a housing assembly 58 in which a drive shaft 59 is rotatably journaled in an appropriate manner. The drive shaft 59 is coupled to be driven by the engine crankshaft 29 in a suitable manner. Since the engine 21 is of the two cycle type, the shaft 59 is driven at crankshaft speed. As will become apparent, the pump 39 delivers three pressure pulses, one to each of a respective outlet for supplying each injector 38 during a single rotation of the drive shaft 59.

Affixed to the drive shaft near one end thereof is the impeller or rotor 61 of a low pressure pump of the sliding vane type. This pump is shown rotated through 90° at the left hand side of FIG. 4 so as to clearly show its construction. Fuel is drawn from a fuel tank 62 through an inlet line 63 in the housing 58 which communicates with the suction side 64 of the pump. The pressure or discharge side 65 of the pump communicates through an internal passageway 66 with a low pressure chamber 67 formed within the housing 58. A pressure regulating valve 68 communicates the pressure line 66 with the supply line 63 so as to maintain a predetermined regulated pressure in the low pressure chamber 67.

A cam disk 69 is supported for rotation within the housing 58 and is coupled for rotary movement with the drive shaft 59 through a splined coupling 71 which permits the cam disk 69 to reciprocate relative to the drive shaft 59. The cam disk 69 has three individual lobes 72 which are adapted to engage rollers 73 journaled for rotation about a transverse axis on a carrier 74. When the lobes 72 engage the rollers 71 the cam disk 69 will be urged to the right as shown in FIG. 4 against the action of a plurality of compression springs 75.

A piston 76 is formed integrally with the cam disk 69 and is slidably supported in the bore 77 of a distributor 78. The distributor 78 and specifically the bore 77 forms a pumping chamber which communicates with the low pressure chamber 67 through an inlet conduit 79 The head of the plunger 76 is provided with three angular spaced reliefs 81 which cooperate with a delivery port 82 formed at the end of the supply passage 79. Hence, when the plunger 76 is moving to the left, a charge will be drawn into the bore 77 and compressed when the plunger 76 moves to the right. This compressed charge is then delivered through a central bore 83 to one of three delivery passages 84 that are formed in the distributer 78 through supply ports 85 of the plunger 76 at the appropriate angular rotation so as to supply pressurized fuel to the injector 38 of the respective cylinder.

A shutoff valve is operated by a solenoid or the like 86 so as to close the delivery port 82 when it is desired to stop the engine. This solenoid 86 is operated in a suitable and well known manner.

The plunger bore 83 also communicates with a cross drilled passageway 87 that cooperates with a spill valve 88 so as to control the amount of fuel discharged by varying the timing at which the ports 87 communicate with the low pressure chamber 67. The spill valve 88 is operated by a pivotally supported lever 89 which is, in turn, controlled by a speed control lever 91 through a spring 92. A governor 93 which is operated off of the drive shaft 59 through a gear train 94 operates to complete the speed control. The lever 89 is connected to the spill valve 88 through a coupling 95 that permits rotary movement of the spill valve 88 while controlling its axial position, as is well known in this art.

The point at which fuel injection is begun is controlled by a timing mechanism, indicated generally by the reference number 96 and shown in actual position in FIG. 3 and rotated through 90° in FIG. 4 so as to more clearly show the construction. Not all of the construction of the timer 96 is, however, shown in FIG. 4 in that a controlling solenoid 97 and the associated mechanism is deleted in FIG. 4. The controlling solenoid 97 includes a winding 98 that acts on an armature 99 so as to reciprocate a sliding piston 101 in a timing advanced position that is normally biased to a timing retard direction by means of a coil compression spring 102 contained within a first chamber 103. The chamber 103 is exposed to static pressure on the supply side of the pump through the conduit 63.

The plunger 101 has a connection to a toggle lever 104 which, in turn, is engaged with the carrier ring 74 for rotating the ring 74 in a timing advance direction, the same direction as the rotation of the crankshaft and opposite to the direction of rotation of the drive shaft 59, as the solenoid 97 is operated so as to urge the plunger 101 to the left. It should be understood that the position of the plunger 101 is variable in a linear direction from the fully advanced timing (full left) injection to a fully retarded timing injection (full right).

Both the exhaust control valves 54 and the timing mechanism 96 are controlled by a CPU, indicated generally by the reference numeral 105 and operating in accordance with a strategy which will be described. Basically, the strategy of control of the exhaust control valve 54 is such that when the engine 21 is operating at light loads and low engine speeds up into the mid range performance, the compression ratio is raised by closure of the exhaust control valves 54. However, as the engine speed and load increases to a point when knocking may become a problem, then the exhaust control valves 54 are rotated to their opened positions so as to provide a reduction in the compression ratio.

These characteristics are determined by various engine running parameters which are inputted to the CPU 105, such as engine speed as determined by an engine speed sensor S1, fuel injection amount as indicated by a fuel injection amount sensor S2, and engine temperature sensed by an engine coolant temperature sensor S3. The fuel injection amount sensed by the sensor S2 can be conveniently determined by measuring the position of the spill ring 88 and hence it is not necessary to measure actual fuel injection amount since the position of the spill ring 88 is indicative of the amount of fuel being injected.

In order to control hydrocarbon, carbon monoxide and carbon particle emissions from exhaust, it is the normal practice to provide a retarded injection timing when operating at low and mid range speeds. The injection timing is then advanced as the load and/or speed increases up to a maximum near wide open throttle full load conditions and then is held constant. However, this injection timing has been found to give rise to a condition wherein there is a relatively high combustion chamber temperature during engine running which is caused by an excess amount of air in relation to the fuel. These conditions give rise to nitrous oxide emissions which are undesirable and should be controlled.

Figure 2:
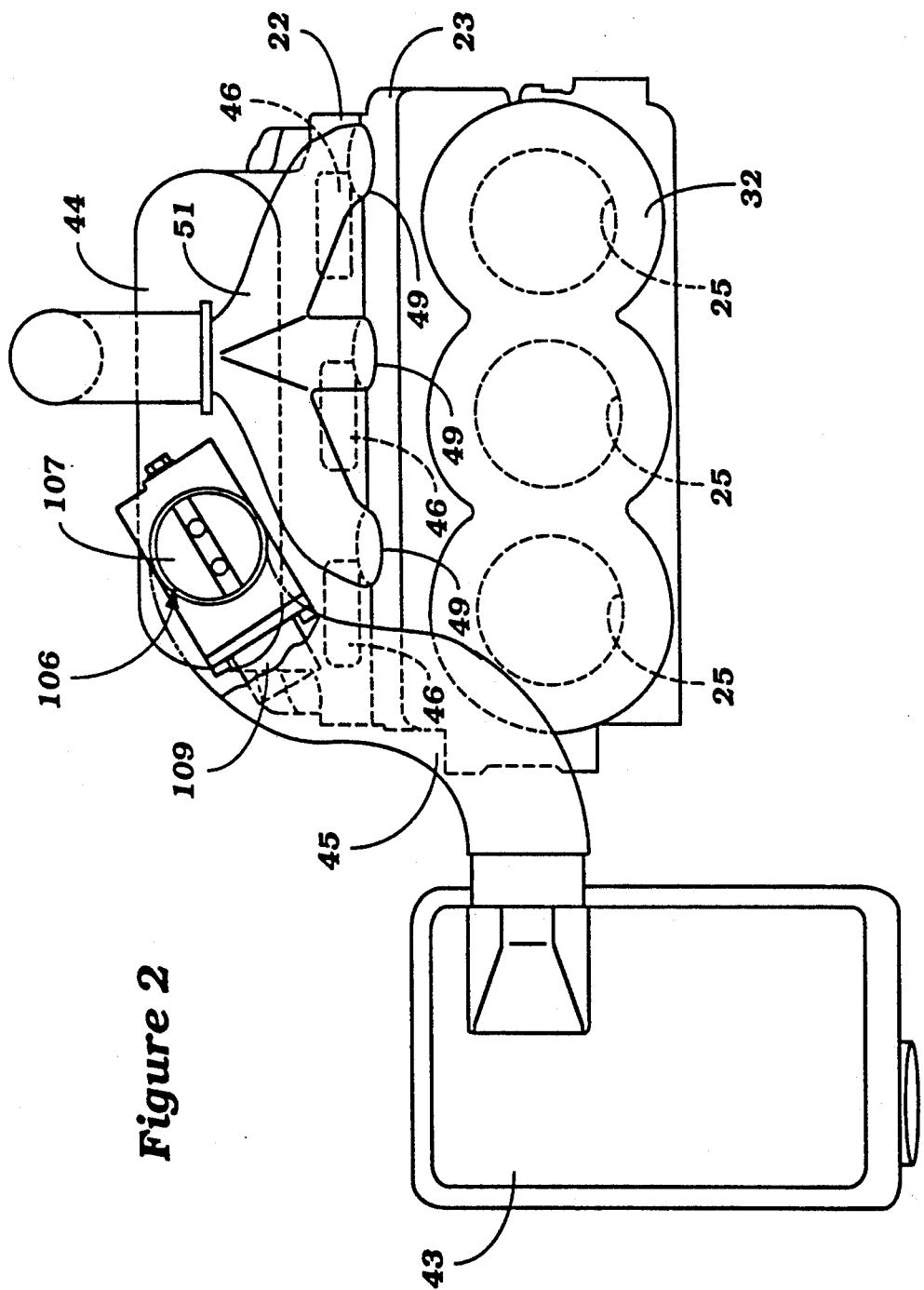
FIG. 2 is a top plan view of the engine.

Therefore, in accordance with a feature of the invention, there is provided in the air induction system between the conduit 45 and the manifold 44 a scavenging air control valve assembly, indicated generally by the reference numeral 106 and which is shown in most detail in FIGS. 1 through 3. The scavenging air control assembly 106 includes a butterfly type throttle valve 107 that is fixed to a throttle valve shaft 108 and which is operated by a stepping motor 109 that is also controlled by the CPU 105. The basic strategy is that the scavenging air control valve 107 is moved toward its closed position so as to reduce the amount of intake air and, accordingly, the amount of scavenge air that will pass through the scavenge passages 48 and thus reduce the oxygen supply in the combustion chamber under certain running conditions when NOx emissions may be a problem. It has found also desirable to provide an advance in injection timing under the conditions when the induction air or scavenge air is throttled. Accordingly, the solenoid 97 is operated in such a manner at this time so as to advance the fuel injection timing.

Figure 5:
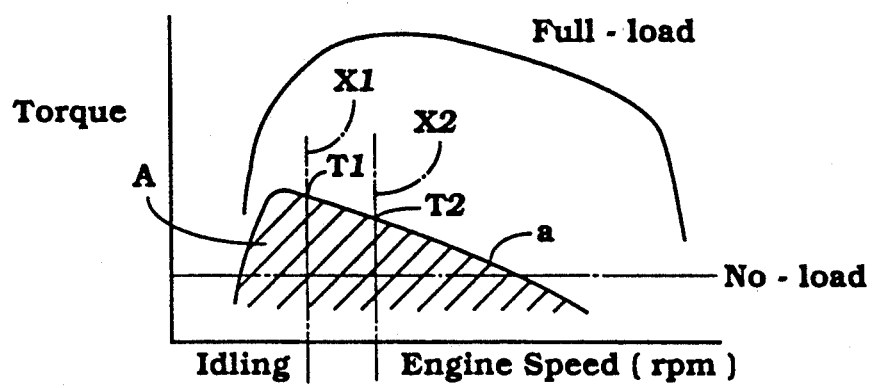
FIG. 5 is a graphic view showing the torque curve with respect to engine speed when operating under normal operation and also when operating under the mode for reducing nitrous oxide emissions.

FIG. 5 is a family of torque curves showing the full load torque curve in solid lines in relation to engine speed and under conditions when throttle valve 107 is not operated. However, under when the throttle valve 107 is operated so as to reduce air scavenging and accordingly combustion chamber temperatures, then the torque curve shown by the line a and embodying the area A will exist. During this time, the fuel injection timing is also advanced as aforenoted.

Figure 6:
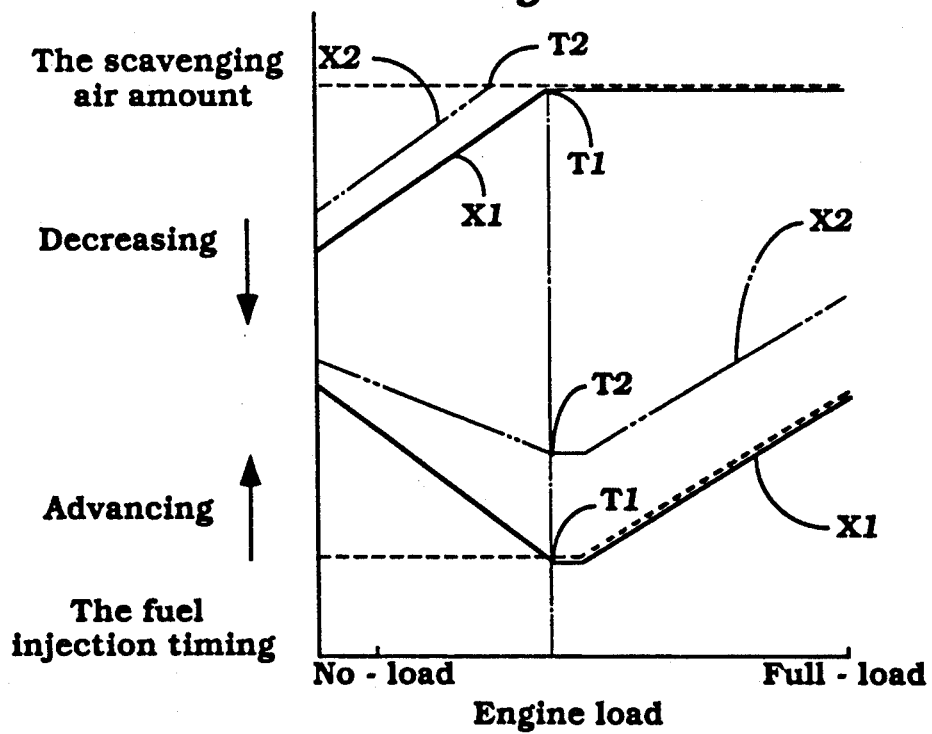
FIG. 6 is a graphic view showing the injection timing curves in accordance with various embodiments and also the arrangement for reducing the amount of scavenging air flow under varying load conditions with engine speed held constant.

FIG. 6 shows the relationship of fuel injection timing and scavenging air flow for two engine speeds X1 and X2 shown in FIG. 5 and under conditions when the system is fully operational so as to operate the throttle valve 107 as well as to advance the injection timing. This procedure will be described in conjunction with the control routine shown in FIG. 7. Reference is now made to that figure.

The program starts at the step S-1 and then moves to the step S-2 wherein engine speed, fuel injection amount and water temperature are sensed by the sensors S1, S2 and S3. The program then moves to the step S-3 where the computer 105 determines whether the engine is operating in a range when the throttle valve 107 should be operated so as to decrease the amount of scavenging air flow. If at the step S-3 it is found that scavenge air flow need not be changed, then the program moves to the step S-4 so as to determine the fuel injection timing and amount and then to the step S-5 so as to set the fuel injection timing and amount.

If, however, at the step S-3 it is determined that the engine is operating in a range where the scavenge air amount should be decreased, then the program moves simultaneously to the steps S-6 and S-7 to determine, respectively, the optimum fuel injection timing and position of the throttle valve 107 in accordance with preprogrammed maps. The program then moves to the steps S-8 and S-9 so as to advance the fuel injection timing and also appropriately position the throttle valve 107 to reduce the amount of scavenging air flow.

FIG. 6 shows two curves at the speeds X1 and X2, as aforenoted, where it is determined at the points T1 or T2 that a change in air scavenging and injection timing is required. The curves for controlling the air flow by the throttle valve 107 and the spark advance by the timing mechanism 96 of the injection unit are typical for certain engine performance.

When the CpU 105 determines that the engine is in the high load range, then the system will operate normally as aforedescribed.

FIG. 8 shows how the relationship between carbon monoxide (CO) and hydrocarbons (HC) is related to NOx under various curves. These curves relate to the amount of scavenging air. It will be seen that, as the amount of scavenging air is decreased, the NOx emissions will decrease. If only scavenging air is decreased beginning at the point B, the curve follows the dot-dash line toward the point C. This provides a substantial reduction in the amount of NOx discharged without significantly effecting or, in fact, by slightly reducing, the CO and HC emissions. However, by advancing the injection timing and moving along the curve to the point D, it can be seen that carbon monoxide and hydrocarbons can be substantially reduced without significantly increasing the amount of NOx discharged. As a result, by employing the combined steps of throttling the scavenge air and advancing the injection timing, both NOx and CO and HC emissions can be reduced.

In the embodiment of the invention as thus far described, the amount of scavenging air has been controlled by providing a throttle valve 107 in the air induction system leading to the crankcase chambers 31. Control of scavenging air can be achieved in a wide variety of other manners. FIGS. 9 and 10 show another embodiment which, except for the manner in controlling the amount of scavenge air flow, is the same as the previously described embodiment. For that reason, components which are the same in this embodiment as the previously described embodiments have been identified by the same reference numerals and will not be described again in detail.

In this embodiment, a bypass chamber 151 is provided that communicates with each to the crankcase chambers 31 and a control valve 152 is mounted in this bypass chamber 151 on a throttle valve shaft 153. The throttle valve shaft 153 is coupled to a servo motor 154 that is controlled by the CPU 105 so as to open and close the control valve 152. A bypass passageway 155 extends from the bypass chamber 151 back to the intake manifold 44 above or upstream of the check valve 47. Accordingly, when the bypass control valve 152 is partially opened, a part of the gases compressed within the crankcase chambers 31 will not be delivered to the combustion chambers 34 through the scavenge passageways 48, but will be returned back to the intake manifold 44. This has the same effect as throttling the intake air in that it reduces the amount of scavenge air flowing.

FIG. 10 shows the control routine for this program and it is the same as the previously described control routine of FIG. 7. However, in this control routine at the steps S-7 and S-9, it is determined what the amount of opening rather than closing of the control valve should be accomplished and the control valve is opened rather than closed. In all other regards, this embodiment is the same as that previously described and its operation should be readily apparent to those skilled in the art.

The foregoing embodiments are preferred embodiments. It should be clear that various changes and modifications may be made without departing from the spirit and scope of the invention, as defined by the appended claims.

We claim:

1. An operator controlled two cycle crankcase compression diesel engine have a cylinder defining in part a combustion chamber, a crankcase, means for admitting at least an air charge to said crankcase, scavenge means for transferring a charge compressed in said crankcase to said combustion chamber, operator controlled speed control means for controlling the speed of operation of said engine and means for reducing the amount of air flow through said scavenge means at low and mid range engine speeds independently of said speed control means for reducing combustion temperature and NOx emissions.

2. A two cycle crankcase compression diesel engine as set forth in claim 1 wherein the means for reducing the amount of air flowing through the scavenge means comprises a throttle valve.

3. A two cycle crankcase compression diesel engine as set forth in claim 2 wherein the throttle valve is provided in the means for admitting at least an air charge to the crankcase.

4. A two cycle crankcase compression diesel engine as set forth in claim 2 further including means for injecting fuel into the combustion chamber.

5. A two cycle crankcase compression diesel engine as set forth in claim 4 further including means for advancing the injection of fuel into the combustion chamber when the means for reducing the amount of air flow through the scavenge means is operative.

6. A two cycle crankcase compression diesel engine as set forth in claim 5 wherein the fuel injection is advanced over a normal advance called for at the condition independent of the reduction of air flow through the scavenge means.

7. A two cycle crankcase compression diesel engine as set forth in claim 6 further including means for raising the compression ratio.

8. A two cycle crankcase compression diesel engine as set forth in claim 7 wherein the means for increasing the compression ratio comprises a supplemental exhaust port and exhaust control valve therefor.

9. A two cycle crankcase compression diesel engine as set forth in claim 2 wherein the throttle means controls a bypass passage extending from the crankcase chamber.

10. A two cycle crankcase compression diesel engine as set forth in claim 9 wherein the bypass passage extends from the crankcase to the means for admitting at least an air charge to the crankcase.

11. A two cycle crankcase compression diesel engine as set forth in claim 10 further including means for injecting fuel into the combustion chamber.

12. A two cycle crankcase compression diesel engine as set forth in claim further including means for advancing the injection of fuel into the combustion chamber when the means for reducing the amount of air flow through the scavenge means is operative.

13. A two cycle crankcase compression diesel engine as set forth in claim 12 wherein the fuel injection is advanced over a normal advance called for at the condition independent of the reduction of air flow through the scavenge means.

14. A two cycle crankcase compression diesel engine as set forth in claim 13 further including means for raising the compression ratio.

15. A two cycle crankcase compression diesel engine as set forth in claim 14 wherein the means for increasing the compression ratio comprises a supplemental exhaust port and exhaust control valve therefor.

16. A method of operating an operator controlled two cycle crankcase compression diesel engine having a cylinder defining in part a combustion chamber, a crankcase, means for admitting at least an air charge to said crankcase, scavenge means for transferring a charge compressed in said crankcase to said combustion chamber, operator controlled speed control means for controlling the speed of operation of said engine and comprising the step of reducing the amount of air flow through said scavenge means without affecting the operator controlled speed control means at low and mid range engine speeds for reducing combustion temperature and NOx emissions.

17. A method as set forth in claim 16 wherein the air flowing through the scavenge means is reduced by throttling.

18. A method as set forth in claim 17 wherein the throttling is done in the means for admitting at least an air charge to the crankcase.

19. A method as set forth in claim 17 further including the steps of injecting fuel into the combustion chamber.

20. A method as set forth in claim 19 further including the step of advancing the injection of fuel into the combustion chamber when reducing the amount of air flow through the scavenge means.

21. A method as set forth in claim 20 wherein the fuel injection is advanced over a normal advance called for at the condition independent of the reduction of air flow through the scavenge means.

22. A method as set forth in claim 16 further including raising the compression ratio under certain running conditions.

23. A method as set forth in claim 17 wherein the throttling is done in a bypass passage extending from the crankcase chamber.

24. A method as set forth in claim 23 wherein the bypass passage extends from the crankcase to the means for admitting at least an air charge to the crankcase.

25. A method as set forth in claim 24 further including injecting fuel into the combustion chamber.

26. A method as set forth in claim 25 further including advancing the injection of fuel into the combustion chamber when reducing the amount of air flow through the scavenge means.

27. A method as set forth in claim 26 wherein the fuel injection is advanced over a normal advance called for at the condition independent of the reduction of air flow through the scavenge means.

28. A method as set forth in claim 27 further including raising the compression ratio under certain running conditions.

* * * * *

UNITED STATES PATENT AND TRADEMARK OFFICE
CERTIFICATE OF CORRECTION

PATENT NO. : 5,178,104
DATED : January 12, 1993
INVENTOR(S) : Ito, et al

It is certified that error appears in the above-identified patent and that said Letters Patent is hereby corrected as shown below:

Column 8, line 60, Claim 12, after "claim" insert --11--.

Column 10, line 2, Claim 20, "step" should be --steps--.

Signed and Sealed this

Eleventh Day of January, 1994

Attest:

BRUCE LEHMAN

Attesting Officer      Commissioner of Patents and Trademarks